United States Patent [19]

Fienup

[11] 4,412,719
[45] Nov. 1, 1983

[54] METHOD AND ARTICLE HAVING PREDETERMINED NET REFLECTANCE CHARACTERISTICS

[75] Inventor: James R. Fienup, Ann Arbor, Mich.
[73] Assignee: Environmental Research Institute of Michigan, Ann Arbor, Mich.
[21] Appl. No.: 252,774
[22] Filed: Apr. 10, 1981
[51] Int. Cl.$^3$ .............................................. G02B 5/32
[52] U.S. Cl. .................................... 350/3.7; 350/163
[58] Field of Search ...................... 350/320, 3.6, 3.67, 350/3.72, 164, 165, 3.7, 3.71, 163

[56] References Cited

U.S. PATENT DOCUMENTS

| | | | |
|---|---|---|---|
| 3,617,274 | 11/1971 | Lin | 430/1 |
| 3,680,945 | 8/1972 | Sheridon | 350/3.61 |
| 3,760,292 | 9/1973 | Kogelnik et al. | 372/96 |
| 3,775,110 | 11/1973 | Bestenreiner et al. | 430/396 |
| 3,776,727 | 12/1973 | Nassenstein et al. | 430/1 |
| 3,778,361 | 12/1973 | Courtney-Pratt | 204/157.1 R |
| 3,794,426 | 2/1974 | Mueller et al. | 356/300 |
| 3,957,353 | 5/1976 | Fienup et al. | 350/162 SF |
| 3,963,490 | 6/1976 | Graube | 430/1 |
| 3,985,439 | 10/1976 | Kiemle | 355/46 |
| 4,076,371 | 2/1978 | Braun et al. | 430/1 |
| 4,093,339 | 6/1978 | Cross | 350/3.7 |
| 4,095,875 | 6/1978 | Lee et al. | 350/320 |
| 4,096,446 | 6/1978 | Haus et al. | 372/96 |
| 4,099,971 | 7/1978 | Graube | 430/1 |

OTHER PUBLICATIONS

B. J. Chang, "Post-Processing of Developed Dichtomated Gelatin Holograms", *Optics Communications*, vol. 17, No. 3, Jun. 1976.
B. J. Chang and C. D. Leonard, "Dichromated Gelatin for the Fabrication of Holographic Optical Elements", *Applied Optics*, vol. 18, No. 14, Jul. 15, 1979.
Harper et al., U.S. Defensive Pub. #T861,026, "Method of Making White Light Holograms", Pub. 4/15/69.

*Primary Examiner*—Bruce Y. Arnold
*Attorney, Agent, or Firm*—Krass, Young & Schivley

[57] ABSTRACT

An optically transmissive article having predetermined net reflectance characteristics and a method of forming such an article is disclosed. The article includes a holographic layer with fringe patterns generally paralleling a major surface of the article. The fringe patterns have been formed in such a way that the amplitude and phase of the light diffracted therefrom is in a predetermined relationship with the amplitude and phase of the reflected light. The relationship between the respective amplitudes and phases of the diffracted and reflected light determines the net reflectance characteristics of the article. In a preferred embodiment, the hologram is formed such that the diffracted light has the same amplitude but is 180° out of phase with the reflected light so as to provide an antireflective coating for the article. In the method of making the article, the phase of one of the beams utilized in the formation of the hologram is adjusted until the desired net reflectance characteristics are detected.

8 Claims, 5 Drawing Figures

METHOD AND ARTICLE HAVING PREDETERMINED NET REFLECTANCE CHARACTERISTICS

BACKGROUND OF THE INVENTION

This invention relates to optical elements such as lenses and the like. More particularly, it involves techniques for manufacturing such articles to provide them with preselected net reflectance characteristics.

Antireflective coatings have been used in the past on optical elements such as lenses and the like. It is generally desirable to keep the net reflectance of lenses as low as possible in order to increase the clarity of image formation. Conventional prior art techniques for making antireflection coatings include the repetitive deposition of various layers of materials having different indices of refraction on a surface of the article. The thicknesses of the individual layers must be carefully controlled and are generally about ¼ of the wavelength of light in question. Typically, the thicknesses are in the order of about ⅛ micron.

It can be appreciated that the prior art methods of making antireflection coatings are extremely expensive, time consuming, and often difficult to consistently achieve. Additionally, the ideal materials for providing optimum results are not always readiliy available. Furthermore, such prior art antireflective coatings are relatively soft and, thus, are subject to damage by scratching during use thereby decreasing their useful lives even if the above noted problems are overcome during manufacture.

The present invention is directed to overcoming one or more of these problems.

SUMMARY OF THE INVENTION

According to the broad teachings of this invention, a major surface of the optical element is coated with a single holographic layer. The holographic layer includes fringe patterns generally paralleling the surface. The fringe patterns in the hologram are formed in a controlled manner such that the amplitude and phase of the light diffracted from the holographic fringes is in a predefined relationship with the amplitude and phase of the reflected light such that the desired net reflectance characteristics are obtained. Where an antireflective coating is desired, the hologram is formed in such manner that the diffracted light has the same amplitude but is 180° out of phase with the reflected light.

In the method of making the article according to the present invention, the surface is coated with a layer of holographic or photosensitive recording material. Mutually coherent object and reference beams impinge the holographic layer at such angles to form fringe patterns therein which are generally parallel with the surface of the article. The total amount of light reflected and transmitted by the layer is detected and used to adjust the phase of one of the beams until the desired net reflectance characteristics are obtained. The fringe patterns in the holographic layer are then permanently recorded. If an antireflective coating is desired, the phase of one of the beams is adjusted until the total amount of detected light during formation of the hologram is at a minimum.

Pursuant to another aspect of the invention only a single light source is needed to generate both beams. The reference beam from the source is directed to the top surface of the holographic layer. The object beam is generated by reflecting that portion of the reference beam transmitted through the holographic layer off of a mirror on the other side of the article. The phase of the object beam is adjusted by regulating the spacing between the mirror and the article.

BRIEF DESCRIPTION OF THE DRAWINGS

These and other advantages of the present invention will become apparent upon reading the following specification and by reference to the drawings in which.

DESCRIPTION OF THE PREFERRED EMBODIMENT

Figure 1:
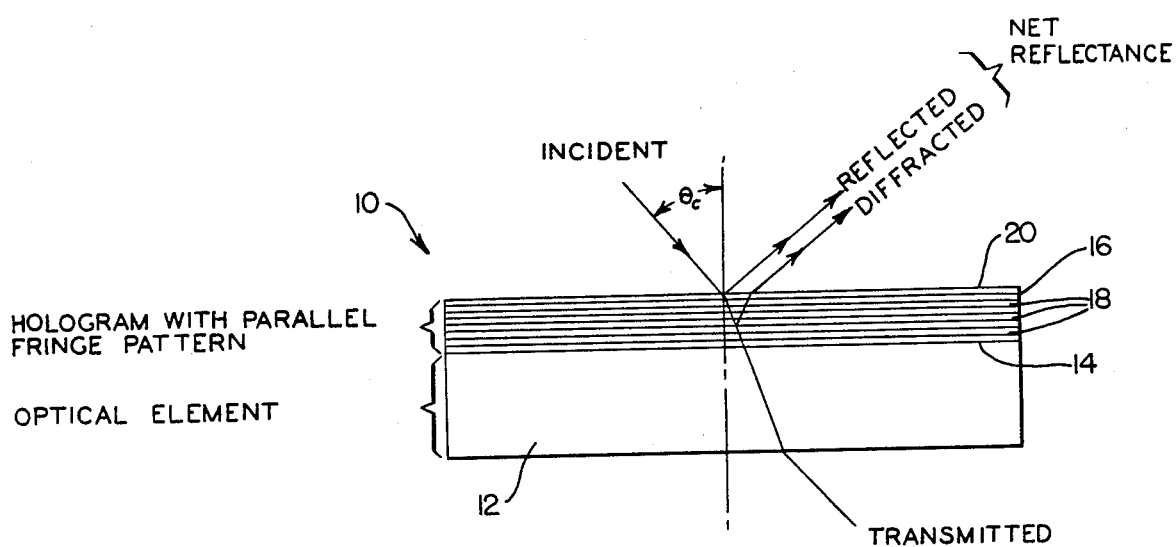
FIG. 1 is a cross-sectional view of an article made in accordance with the preferred embodiment of the invention.

FIG. 1 illustrates an article made in accordance with the present invention. Article 10 includes an optical element 12 having a major surface 14. For purposes of this invention, the term "optical element" means a light transmissive device which performs a given function on the light passing through it. Non-limiting examples of optical elements are lenses, photo-optical devices, filters and solar collection panels as compared to films which merely record an image pattern. The present invention finds particular utility for optical elements in which predetermined net reflectance characteristics are desirable.

Article 10 includes a single layer 16 of photosensitive or holographic material on surface 14. Layer 16 may be a variety of materials capable of recording a hologram. Dichromated gelatin is one such material. Layer 16 includes a hologram with fringe patterns 18 paralleling surface 14. The parallel fringe patterns 18 are in contrast with conventional holograms in which the fringe patterns extend transversely to their substrate. The hologram is formed such that incident light which is diffracted by fringes 18 will be in a predefined amplitude and phase relationship with the phase and amplitude of the incident light reflected from the top surface 20 of layer 16.

Figure 2:
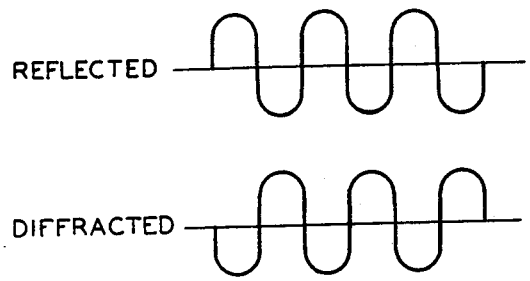
FIG. 2 is a wave form diagram representing the amplitude and phase relationship between the reflected and diffracted light from the article shown in FIG. 1.

Assume, for example, that element 12 is a glass lens and it is desirable to have an air-to-glass interface with zero net reflectance for a given wavelength of light at a given angle ($\theta_c$) of the incident light. Ordinarily, the net reflectance of commonly used glass is in the order of about 5-10%. However, when the glass element 12 is coated with the holographic layer 16, the net reflectance of the article is given by the sum of the complex reflectance from the air-layer 20 interface and the complex diffraction efficiency of the holographic layer 16. The complex reflectance is the ratio of the reflected wavefront complex amplitude to the incident wavefront complex amplitude. The complex diffraction efficiency is the ratio of the diffracted wavefront complex amplitude to the incident wavefront complex amplitude. If the complex diffraction efficiency of the hologram is equal in magnitude but opposite in sign (i.e. $\pi$ radians or 180° out of phase) to the complex reflectivity, then perfect cancellation is possible. In other words, the hologram acts as an antireflective coating with the diffracted wavefront from the hologram cancelling out the reflected wavefront from the air-layer interface. FIG. 2 shows wave form diagrams comparing the reflected and diffracted wavefront from an article having such an antireflective coating.

Figure 3:
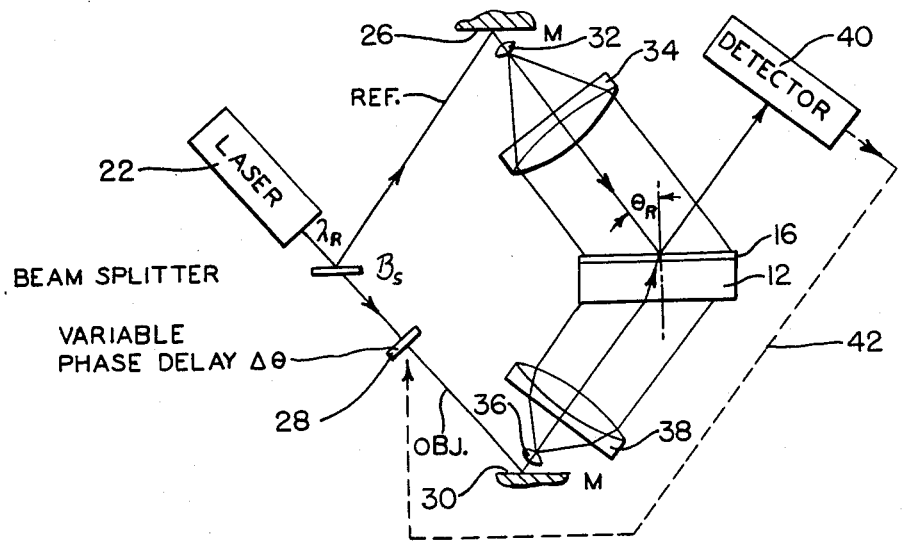
FIG. 3 is a schematic diagram of apparatus used in one method of the invention.

FIG. 3 illustrates apparatus used in making the article 10 according to one embodiment of the method of this invention. A coherent light source such as laser 22 provides a beam of light having the desired wavelength. A conventional beam splitter 24 splits the beam into two beams, one of which is reflected off mirror 26 whereas the other beam passes through a variable phase delay device 28 and is reflected off of mirror 30. The first beam will serve as a reference beam whereas the second beam will serve as an object beam. The reference beam passes through a lens 32 which expands the beam. Spatial filters (not shown) may be used if desired to clean up the beam. A collimating lens 34 directs the light rays onto holographic recording material layer 16 at the desired angle of incidence ($\theta_R$). Layer 16 has been previously applied to the optical element 12 by conventional techniques.

The object beam is similarly expanded by lens 36 and collimated by collimating lens 38. The light rays from lens 38 pass through the underside of element 12 and are transmitted through element 12 until they strike layer 16. It is important that the angles of the object and reference beams be controlled such that the surface layer 16 generally bisects the two beams. By doing so the interference or fringe pattern generated by the two beams in layer 16 will lie parallel with the upper surface 14 of element 12.

A light intensity detector 40 is used to monitor the net reflectance of the article during the hologram recording mode. Light intensity detectors are well known in the art and may, for example, comprise a matrix of photocells or other electro-optical devices. Detector 40 will thus detect the intensity of the sum of that portion of the reference beam reflected from the air-layer interface from surface 20 and that portion of the object beam transmitted by layer 16. The intensity will vary sinusoidally with the relative phase of the two wave fronts.

When making an antireflective coating, the phase of one of the beams is then adjusted or delayed until the output of detector 40 is at a minimum level. In the embodiment shown in FIG. 3, this is accomplished by way of phase delay device 28. Phase delay device 28 may be provided by a variety of devices which delay the phase of the beam passing through it. Acousto-optical cells or a piece of pivoting glass are examples of typical phase delay devices. It is envisioned that automatic control of the phase delay device 28 may be provided by way of a feedback control line 42 from detector 40. In such manner, the phase of the object beam will be continually adjusted until the minimum light intensity is sensed by detector 40. The fringe pattern is then permanently recorded. The permanent recording of the hologram will depend upon the type of holographic recording material utilized and is well within the skill of the ordinary practitioners.

When processing antireflective coatings it is also necessary to control the intensities of the two recording beams such that the amplitudes of the reflected and diffracted wavefronts will be the same. This is accomplished by the appropriate control of the exposure level and processing of the hologram in a well known manner. See, for example, Chang et al, "Dichromated Gelatin for the Fabrication of Holographic Optical Elements", *Applied Optics,* Volume 18, Pages 2407-17 (July 15, 1979).

Figure 4:
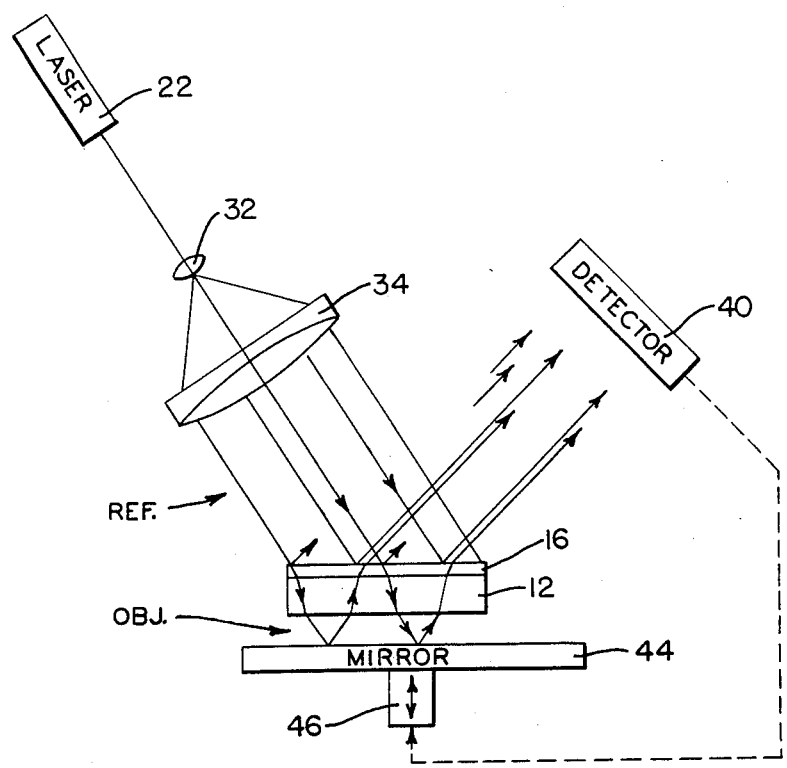
FIG. 4 is a schematic diagram of apparatus used in an alternative method.

FIG. 4 illustrates an alternative method of making the article 10. For convenience, the same reference numerals as used in previous examples will be used for common elements. In this embodiment, the coherent light from laser 22 is expanded by way of lens 32 and collimated by lens 34. The light rays from lens 34 provides the reference beam which strikes layer 16 at the desired angle. The object beam is generated from that portion of the reference beam which is transmitted through layer 16 and element 12. The light rays emitted from the bottom surface of element 12 are reflected off of a mirror 44 and directed upwardly to layer 16 for forming the hologram. As in the previous example, detector 40 monitors the intensity of the reflected and transmitted light. In this embodiment the output of detector 40 is coupled to a reciprocating support 46 for mirror 44 which moves the mirror 44 to and from the bottom surface of element 12. The spacing between mirror 44 and layer 16 defines the phase delay of the object beam. The farther mirror 44 is away from layer 16 the more delay is created in the phase of the object beam with respect to the reference beams. Mirror 44 is moved until the output of detector 40 is at a minimum, at which time the hologram in layer 16 is permanently recorded.

Figure 5:
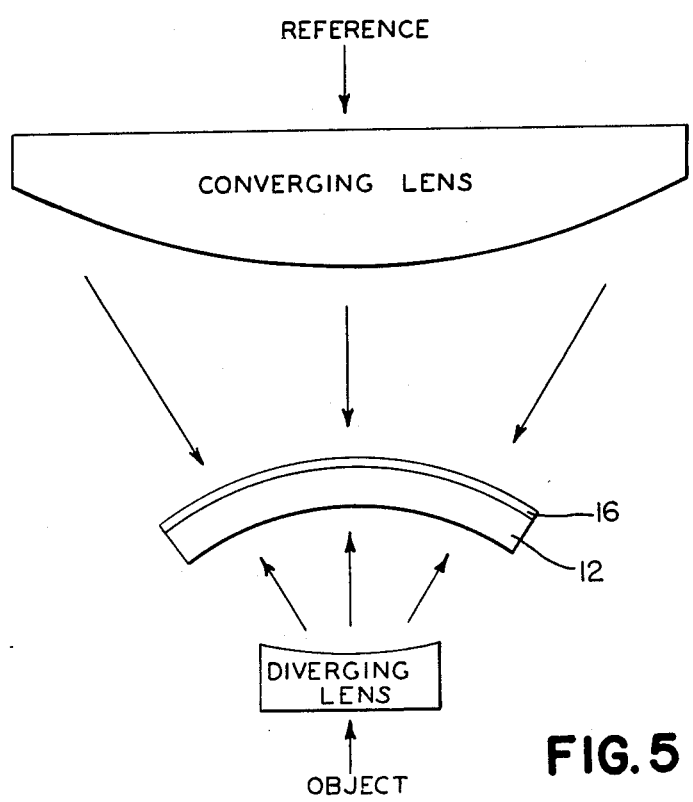
FIG. 5 is a view which schematically illustrates the generation of beams used in connection with making articles having curved surfaces.

FIG. 5 shows a modification of the invention which can be used when element 12 has a curved surface. Keeping in mind that it is important that the fringe patterns in the holographic layer 16 must generally parallel surface 14, a combination of converging 48 and divering 50 lenses are used in place of lenses 34 and 38 of the example shown in FIG. 3. This modification insures that the object and reference light rays are directed at holographic layer 16 at angles such that layer 16 generally bisects the two beams throughout the entirety of curved surface 14.

Other modifications of the recording system will become apparent to one skilled in the art depending upon the configuration of the article being made. For example, in the modification of FIG. 5 the position of detector 40 will have to be arranged such that it falls in the path of the reflected and transmitted light. Similarly, non-ideal effects such as shrinking of layer 16 during processing or changes in wavelength from source 22 can be compensated by recording the fringes at adjusted wavelengths, angles, or phases to counteract these efforts. Alternatively, effects of shrinkage can be compensated after processing as described by B. J. Chang in his article "Post-Processing of Developed Dichromated Gelatin" appearing in *Optics Communications,* Vol. 7, pgs. 270-274 (June 1976).

In those applications where the article may experience excessive humidity it may be necessary to coat the holographic layer with a moisture impervious barrier, especially where dichromated gelatin is used as the recording material. This may be accomplished by applying a thin glass cover plate onto the top surface of the holographic layer. It is envisioned that other methods may be used in which the protective barrier may be sprayed or otherwise deposited onto the gelatin for humidity protection. These additional protective layers may alter the phase relationships of the reflected and diffracted light from the article. However, suitable adjustments can be made to counteract these effects along these lines of those discussed above to compensate for the non-ideal effects. For example, once the changes due to the addition of the protective coating are known then the fringe pattern in the hologram can be formed by adjusting the relative phases of the recording beams in such a manner to offset the changes introduced by the protective coating.

In view of the foregoing it can now be appreciated that the present invention provides an extremely efficient method of making an article with predetermined net reflectance characteristics. While the invention finds particular utility in making antireflective coatings, the net reflectance of the article so manufactured can be adjusted as desired by the appropriate control of the amplitude and phase of the recording beams. In any event, the method of this invention may be easily employed without undue concern about the thickness of the holographic layer and a variety of readily available holographic recording materials may be used. The articles so manufactured are expected to exhibit much better wear characteristics than those antireflective coatings made in accordance with the prior art.

While this invention has been described in connection with specific examples thereof, other modifications will become apparent to one skilled in the art upon a study of the specification, drawings and claims.

What is claimed:
1. An article having predetermined net reflectance characteristics, said article comprising:
   an optical element having a major surface;
   a holographic layer on the surface for reflecting light at a given amplitude and phase from the interface between the layer and the surrounding environment above the layer, said holographic layer having fringe patterns parallel with the surface, operative for diffracting light from the fringes at a predefined amplitude and phase with respect to the amplitude and phase of the reflected light;
   whereby the net reflection of light impinging on the article is determined by the amplitude and phase relationship between the reflected and diffracted light from the holographic layer.
2. The layer of claim 1 wherein said fringe patterns are operative to diffract the light at the same amplitude as, but 180° out of phase, with the reflected light.
3. A method of making an article having predetermined net reflectance characteristics, said method comprising:
   coating a surface of an optical element with a layer of holographic recording material;
   directing a first beam through the optical element to strike the layer from the underside thereof;
   directing a second beam to strike the layer from above at such an angle to form fringe patterns therein which generally parallel the surface of the optical element;
   detecting the total amount of light provided by the sum of the portion of the first beam transmitted by the layer and the portion of the second beam reflected by the layer;
   adjusting the phase of one of the beams as a function of the detected amount of light until the desired net reflectance characteristics are obtained; and
   permanently recording the fringe pattern in the holographic layer whereby said fringe pattern serves to diffract light impinging on the layer at a predetermined amplitude and phase relationship with the amplitude and phase of the light reflected from the layer.
4. The method of claim 3 wherein the phase of one of the beams is adjusted until the minimum amount of total light is detected whereby the layer serves as an antireflective coating.
5. The method of claim 3 which further includes:
   applying a moisture impervious coating to said layer; and wherein the relative phases of the beams are adjusted to counteract changes made by the coating to the net reflectance characteristics of the article.
6. A method of making an article having predetermined net reflectance characteristics, said method comprising:
   coating a surface of an optical element with a layer of holographic recording material;
   directing a first beam to strike the layer from one side thereof;
   positioning a mirror on the opposite side of the layer;
   reflecting that portion of the first beam transmitted by the layer off of the mirror to generate a second beam which strikes the layer from said opposite side;
   detecting the total amount of the light provided by the sum of that portion of the first beam reflected from said layer and that portion of the second beam transmitted by the layer;
   moving the mirror to alter its spacing from the layer as a function of the detected amount of light until the desired net reflectance characteristics are obtained, the spacing of the mirror with respect to the layer thereby adjusting the phase of the second beam with respect to the first beam; and
   permanently recording the fringe pattern in the holographic layer whereby the fringe pattern serves to diffract light impinging on the layer at a predetermined amplitude and phase relationship with the amplitude and phase of the light reflected from the layer.
7. The method of claim 6 wherein said mirror is moved until a minimum amount of light is detected whereby said layer provides an antireflective coating for the device.
8. A method of making an antireflective coating for an article, said method comprising:
   coating a surface of an optical element with a layer of holographic recording material;
   directing a first beam through the optical element to strike the layer from the underside thereof;
   directing a second beam to strike the layer from above at such an angle to form fringe patterns therein which generally parallel the surface of the optical element;
   detecting the total amount of light provided by the sum of that portion of the first beam transmitted by the layer and that portion of the second beam reflected from the layer;
   adjusting the phase of one of the beams until the detected amount of transmitted light is at a minimum level; and
   permanently recording the holographic layer such that the amount of light refracted from the fringe pattern therein is at the same amplitude but 180° out of phase with the light reflected from the layer whereby said layer forms an antireflective coating for the article.

* * * * *